(12) United States Patent
Dugas et al.

(10) Patent No.: US 12,725,885 B2
(45) Date of Patent: Sep. 1, 2026

(54) BUS BAR WELDING SOLUTIONS FOR TRACTION BATTERY PACKS

(71) Applicant: FORD GLOBAL TECHNOLOGIES, LLC, Dearborn, MI (US)

(72) Inventors: Marc Dugas, Wixom, MI (US); Robert C. Keeton, Van Buren Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 985 days.

(21) Appl. No.: 17/944,322

(22) Filed: Sep. 14, 2022

(65) Prior Publication Data

US 2023/0327293 A1 Oct. 12, 2023

Related U.S. Application Data

(60) Provisional application No. 63/322,766, filed on Mar. 23, 2022.

(51) Int. Cl.

| | |
|---|---|
| ***H01M 50/516*** | (2021.01) |
| ***B23K 26/21*** | (2014.01) |
| ***B23K 26/60*** | (2014.01) |
| ***B23K 101/36*** | (2006.01) |
| ***B60L 50/64*** | (2019.01) |
| ***H01M 50/543*** | (2021.01) |

(52) U.S. Cl.

CPC ........... *H01M 50/516* (2021.01); *B23K 26/21* (2015.10); *B23K 26/60* (2015.10); *B60L 50/64* (2019.02); *H01M 50/543* (2021.01); *B23K 2101/36* (2018.08); *H01M 2220/20* (2013.01)

(58) Field of Classification Search

None

See application file for complete search history.

(56) References Cited

U.S. PATENT DOCUMENTS

| | | | |
|---|---|---|---|
| 8,089,248 | B2 | 1/2012 | Tabatowski-Bush |
| 8,968,912 | B2 | 3/2015 | Maguire et al. |
| 9,217,781 | B2 | 12/2015 | Tabatowski-Bush et al. |
| 9,425,628 | B2 | 8/2016 | Pham et al. |
| 9,446,680 | B2 | 9/2016 | Chen et al. |
| 9,515,357 | B2 | 12/2016 | Haskins et al. |

(Continued)

FOREIGN PATENT DOCUMENTS

| | | | |
|---|---|---|---|
| CN | 101860053 | A | 10/2010 |
| CN | 103762333 | A | 4/2014 |

(Continued)

OTHER PUBLICATIONS

CN109865968 Image and translation (Year: 2025).*
JP2008137011 image and translation (Year: 2025).*

*Primary Examiner* — Maria Laios
(74) *Attorney, Agent, or Firm* — David B. Kelley; Carlson, Gaskey & Olds, P.C.

(57) ABSTRACT

Bus bar welding solutions are disclosed for electrically connecting bus bars to battery cell terminals within a battery system. An exemplary method may include performing weld repair operations. The weld repair operations may include creating a repair weld bead at a weld repair zone of the bus bar. The weld repair zone may include an area of the bus bar that is covered by a pressing device during a pressing operation and a primary welding operation of the method.

17 Claims, 6 Drawing Sheets

(56) References Cited

U.S. PATENT DOCUMENTS

| | | | |
|---|---|---|---|
| 9,799,932 B2 | 10/2017 | Haskins et al. | |
| 10,109,897 B2 | 10/2018 | Haskins et al. | |
| 10,566,647 B2 | 2/2020 | Andryukov et al. | |
| 10,601,006 B2 | 3/2020 | Maguire et al. | |
| 10,608,222 B2 | 3/2020 | Montgomery et al. | |
| 10,759,281 B2 | 9/2020 | Miller et al. | |
| 10,784,495 B2 | 9/2020 | Fernandez-Galindo et al. | |
| 11,005,131 B2 | 5/2021 | Zhou et al. | |
| 11,024,913 B2 | 6/2021 | Subramanian et al. | |
| 11,050,125 B1 | 6/2021 | Zhu et al. | |
| 11,114,726 B2 | 9/2021 | Gu et al. | |
| 11,128,009 B2 | 9/2021 | Chen et al. | |
| 11,139,537 B2 | 10/2021 | Wu et al. | |
| 11,217,847 B2 | 1/2022 | Eftekhari et al. | |
| 11,258,119 B2 | 2/2022 | Wang et al. | |
| 11,264,669 B2 | 3/2022 | Jiang | |
| 11,283,130 B2 | 3/2022 | Chen et al. | |
| 11,289,750 B2 | 3/2022 | Zhou et al. | |
| 11,302,972 B2 | 4/2022 | Chu et al. | |
| 11,302,973 B2 | 4/2022 | Maguire et al. | |
| 11,302,990 B2 | 4/2022 | Huang et al. | |
| 11,329,347 B2 | 5/2022 | Huang et al. | |
| 11,335,960 B2 | 5/2022 | Wang et al. | |
| 11,362,392 B2 | 6/2022 | Wang et al. | |
| 11,362,393 B2 | 6/2022 | Wang et al. | |
| 11,387,519 B2 | 7/2022 | Huang et al. | |
| 11,404,744 B1 | 8/2022 | Yang et al. | |
| 11,417,932 B2 | 8/2022 | Tang et al. | |
| 11,417,936 B2 | 8/2022 | Wang et al. | |
| 2003/0111512 A1* | 6/2003 | O'Connell | H01M 50/534 228/110.1 |
| 2010/0259221 A1 | 10/2010 | Tabatowski-Bush | |
| 2010/0314362 A1* | 12/2010 | Albrecht | B23K 37/00 219/121.63 |
| 2013/0164592 A1 | 6/2013 | Maguire et al. | |
| 2017/0104251 A1 | 4/2017 | Wang | |
| 2018/0138483 A1* | 5/2018 | Sekine | H01M 10/48 |
| 2019/0027734 A1* | 1/2019 | Guo | H01M 50/55 |
| 2019/0305389 A1 | 10/2019 | Poirier et al. | |
| 2020/0091494 A1 | 3/2020 | Fernandez-Galindo et al. | |
| 2020/0203684 A1 | 6/2020 | Chen et al. | |
| 2020/0203779 A1 | 6/2020 | Wang et al. | |
| 2020/0212387 A1 | 7/2020 | Su et al. | |
| 2020/0212397 A1 | 7/2020 | Wang et al. | |
| 2020/0212418 A1 | 7/2020 | Chen et al. | |
| 2020/0381697 A1 | 12/2020 | Fernandez-Galindo et al. | |
| 2021/0066686 A1 | 3/2021 | Siewert et al. | |
| 2021/0091348 A1 | 3/2021 | Lateef et al. | |
| 2021/0091437 A1 | 3/2021 | Chen et al. | |
| 2021/0104798 A1 | 4/2021 | Jiang et al. | |
| 2021/0119279 A1 | 4/2021 | Wang et al. | |
| 2021/0218117 A1 | 7/2021 | Zhu et al. | |
| 2021/0229541 A1 | 7/2021 | Smith et al. | |
| 2021/0305641 A1 | 9/2021 | Bai et al. | |
| 2021/0305642 A1 | 9/2021 | Bai et al. | |
| 2021/0320349 A1 | 10/2021 | Jiang et al. | |
| 2021/0320372 A1 | 10/2021 | Jiang et al. | |
| 2021/0402863 A1 | 12/2021 | Huang et al. | |
| 2021/0408634 A1 | 12/2021 | Yin et al. | |
| 2022/0052414 A1 | 2/2022 | Huang et al. | |
| 2022/0052415 A1 | 2/2022 | Huang et al. | |
| 2022/0059897 A1 | 2/2022 | Huang et al. | |
| 2022/0059902 A1 | 2/2022 | Jiang et al. | |
| 2022/0077521 A1 | 3/2022 | Jin et al. | |
| 2022/0085450 A1 | 3/2022 | Chu et al. | |
| 2022/0102800 A1 | 3/2022 | Wang et al. | |
| 2022/0109211 A1 | 4/2022 | Wang et al. | |
| 2022/0123394 A1 | 4/2022 | Zhang et al. | |
| 2022/0123423 A1 | 4/2022 | Wang et al. | |
| 2022/0149458 A1 | 5/2022 | Jiang et al. | |
| 2022/0158296 A1 | 5/2022 | Chen et al. | |
| 2022/0185088 A1 | 6/2022 | Zhang et al. | |
| 2022/0190416 A1 | 6/2022 | Wu | |
| 2022/0190423 A1 | 6/2022 | Wu et al. | |
| 2022/0216555 A1 | 7/2022 | Huang et al. | |
| 2022/0221084 A1 | 7/2022 | Huang et al. | |
| 2022/0231370 A1 | 7/2022 | Yang et al. | |
| 2022/0231371 A1 | 7/2022 | Jiang et al. | |
| 2022/0255172 A1 | 8/2022 | Guo et al. | |
| 2022/0367982 A1* | 11/2022 | Payne | H01M 50/249 |

FOREIGN PATENT DOCUMENTS

| | | |
|---|---|---|
| CN | 101860053 B | 4/2015 |
| CN | 107096990 A | 8/2017 |
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104229 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331981 B | 9/2021 |
| CN | 113385884 A | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |

(56) References Cited

FOREIGN PATENT DOCUMENTS

| | | | |
|---|---|---|---|
| CN | 111430826 | B | 6/2022 |
| CN | 216720168 | U | 6/2022 |
| CN | 216720172 | U | 6/2022 |
| CN | 216750072 | U | 6/2022 |
| CN | 216750142 | U | 6/2022 |
| CN | 216872085 | U | 7/2022 |
| CN | 216903107 | U | 7/2022 |
| CN | 216903128 | U | 7/2022 |
| CN | 216903497 | U | 7/2022 |
| DE | 102016119118 | A1 | 4/2017 |
| DE | 102017121796 | A1 | 3/2018 |
| DE | 102019108631 | A1 | 10/2019 |
| DE | 102019125140 | A1 | 3/2020 |
| DE | 102020124986 | A1 | 3/2021 |
| DE | 102021101385 | A1 | 9/2021 |
| DE | 102021005923 | A1 | 1/2022 |
| EP | 3671904 | A1 | 6/2020 |
| EP | 3671940 | A1 | 6/2020 |
| EP | 3672377 | A1 | 6/2020 |
| EP | 3675204 | A1 | 7/2020 |
| EP | 3675207 | A1 | 7/2020 |
| EP | 3675216 | B1 | 7/2020 |
| EP | 3675217 | A1 | 7/2020 |
| EP | 3675220 | A1 | 7/2020 |
| EP | 3675221 | A1 | 7/2020 |
| EP | 3675236 | A1 | 7/2020 |
| EP | 3675271 | A1 | 7/2020 |
| EP | 3798491 | A1 | 3/2021 |
| EP | 3799150 | A1 | 3/2021 |
| EP | 3799151 | A1 | 3/2021 |
| EP | 3905366 | A1 | 3/2021 |
| EP | 3806231 | A1 | 4/2021 |
| EP | 3852187 | A1 | 7/2021 |
| EP | 3920255 | A1 | 8/2021 |
| EP | 3883005 | A1 | 9/2021 |
| EP | 3883006 | A1 | 9/2021 |
| EP | 3883042 | A1 | 9/2021 |
| EP | 3886198 | A1 | 9/2021 |
| EP | 3886200 | A1 | 9/2021 |
| EP | 3886201 | A1 | 9/2021 |
| EP | 3671893 | B1 | 11/2021 |
| EP | 3699979 | B1 | 11/2021 |
| EP | 3920315 | A1 | 12/2021 |
| EP | 3930026 | A1 | 12/2021 |
| EP | 3930027 | A1 | 12/2021 |
| EP | 3944397 | A1 | 1/2022 |
| EP | 3944398 | A1 | 1/2022 |
| EP | 3955333 | A1 | 2/2022 |
| EP | 3799194 | B1 | 3/2022 |
| EP | 3985787 | A1 | 4/2022 |
| EP | 3799153 | B1 | 6/2022 |
| IN | 110416448 | A | 11/2019 |
| JP | 2010246372 | A | 10/2010 |
| KR | 1020100112530 | A | 10/2010 |
| KR | 101695641 | B1 | 1/2017 |

* cited by examiner

BUS BAR WELDING SOLUTIONS FOR TRACTION BATTERY PACKS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to bus bar welding operations for electrically connecting bus bars to battery cell terminals.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A method of assembling a traction battery pack according to an exemplary aspect of the present disclosure includes, among other things, performing a primary welding operation on a bus bar of a battery system of the traction battery pack, and performing a secondary welding operation on the bus bar. During the secondary welding operation, a repair weld bead is formed within a weld repair zone of the bus bar.

In a further non-limiting embodiment of the foregoing method, during the primary welding operation, a primary weld bead is formed on the bus bar.

In a further non-limiting embodiment of either of the foregoing methods, the primary weld bead is formed at a location that is adjacent to but not within the weld repair zone.

In a further non-limiting embodiment of any of the foregoing methods, the primary weld bead includes an arced shape or a horseshoe shape.

In a further non-limiting embodiment of any of the foregoing methods, the method includes, prior to performing the secondary welding operation, performing a post electrical test on the primary weld bead.

In a further non-limiting embodiment of any of the foregoing methods, the method includes, prior to performing the primary welding operation and the secondary welding operation, cleaning a terminal of a battery cell that the bus bar is to be connected to.

In a further non-limiting embodiment of any of the foregoing methods, the method includes, prior to performing the primary welding operation and the secondary welding operation, pressing the bus bar against a terminal of a battery cell of the battery system.

In a further non-limiting embodiment of any of the foregoing methods, during the primary welding operation, a pressing device for performing the pressing is positioned to cover the weld repair zone of the bus bar.

In a further non-limiting embodiment of any of the foregoing methods, during the secondary welding operation, the weld repair zone is uncovered by the pressing device.

In a further non-limiting embodiment of any of the foregoing methods, the primary welding operation and the secondary welding operation are laser welding operations.

A method for assembling a traction battery pack according to another exemplary aspect of the present disclosure includes, among other things, pressing a bus bar against a terminal of a battery cell, forming a primary weld bead for joining the bus bar to the terminal, testing the primary weld bead, and, when the primary weld bead does not pass the testing, forming a repair weld bead adjacent to the primary weld bead. The repair weld bead is formed at a weld repair zone of the bus bar that is covered by a pressing tool when forming the primary weld bead.

In a further non-limiting embodiment of the foregoing method, the battery cell is part of a cell matrix of a cell-to-pack battery system of the traction battery pack.

In a further non-limiting embodiment of either of the foregoing methods, the cell matrix is received within a cell-compressing opening of an enclosure tray of the traction battery pack during the pressing and the forming.

In a further non-limiting embodiment of any of the foregoing methods, forming the primary weld bead includes performing a first laser welding operation, and forming the repair weld bead includes performing a second laser welding operation.

In a further non-limiting embodiment of any of the foregoing methods, the primary weld bead includes an arced shape or a horseshoe shape.

In a further non-limiting embodiment of any of the foregoing methods, the repair weld bead is shaped differently than the primary weld bead.

In a further non-limiting embodiment of any of the foregoing methods, the method includes, prior to the pressing and the forming, cleaning the terminal of the battery cell.

In a further non-limiting embodiment of any of the foregoing methods, the bus bar is connected to a carrier of a bus bar module.

In a further non-limiting embodiment of any of the foregoing methods, the method includes, prior to the pressing, positioning the bus bar module over a cell stack that includes the battery cell.

In a further non-limiting embodiment of any of the foregoing methods, the cell stack is part of a cell-to-pack battery system of the traction battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details bus bar welding solutions for electrically connecting bus bars to battery cell terminals within a battery system. An exemplary method may include performing weld repair operations. The weld repair operations may include creating a repair weld bead at a weld repair zone of the bus bar. The weld repair zone may include an area of the bus bar that is covered by a pressing device during a pressing operation and a primary welding operation of the method. These and other features are discussed in greater detail in the following paragraphs of this detailed description.

Figure 1:
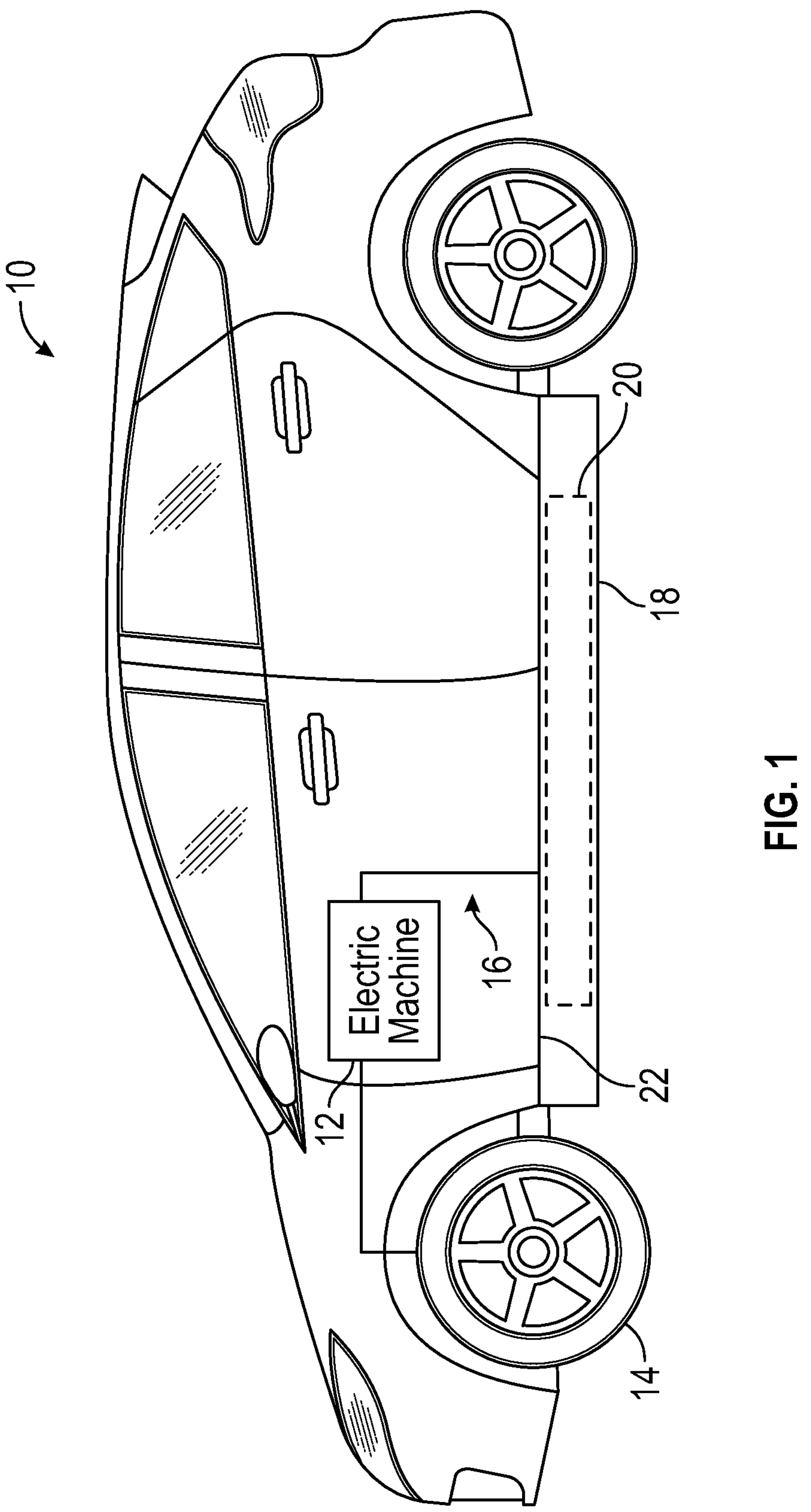
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules inside the batter enclosure. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
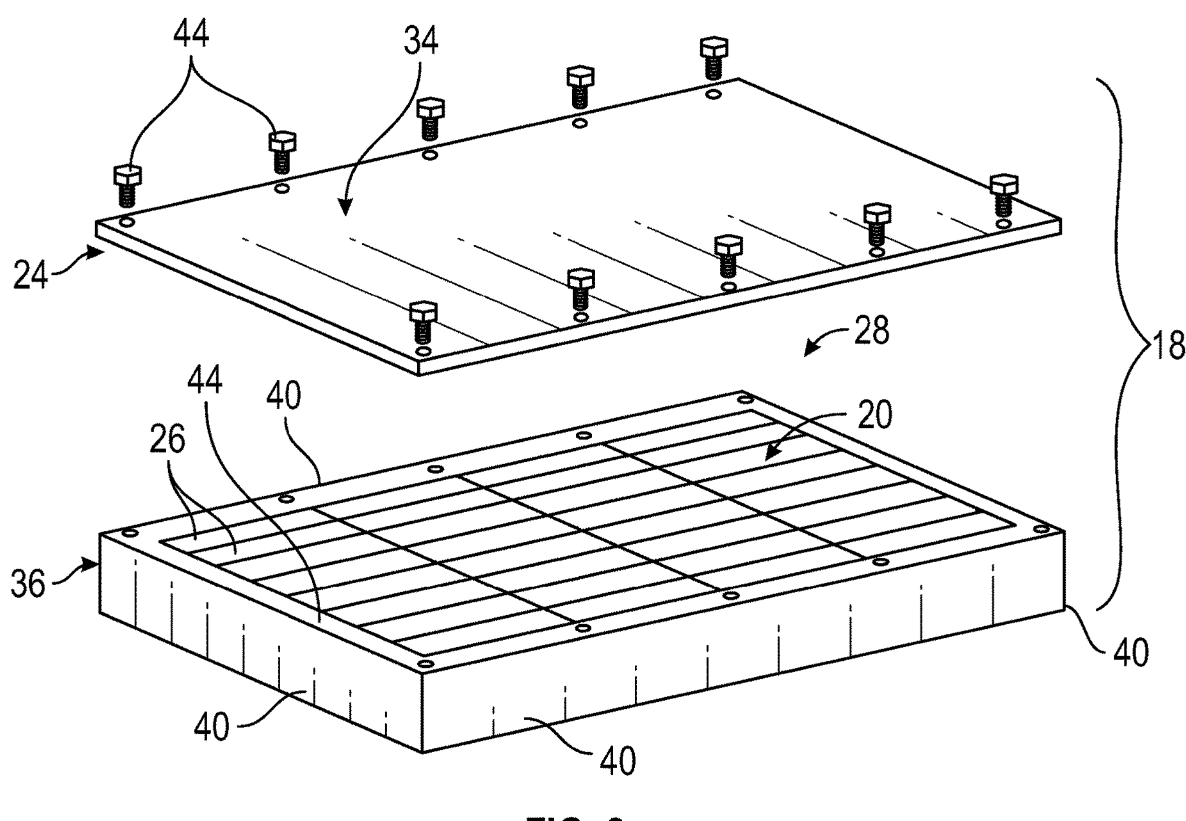
FIG. 2 illustrates a traction battery pack of the electrified vehicle of FIG. 1.
Figure 3:
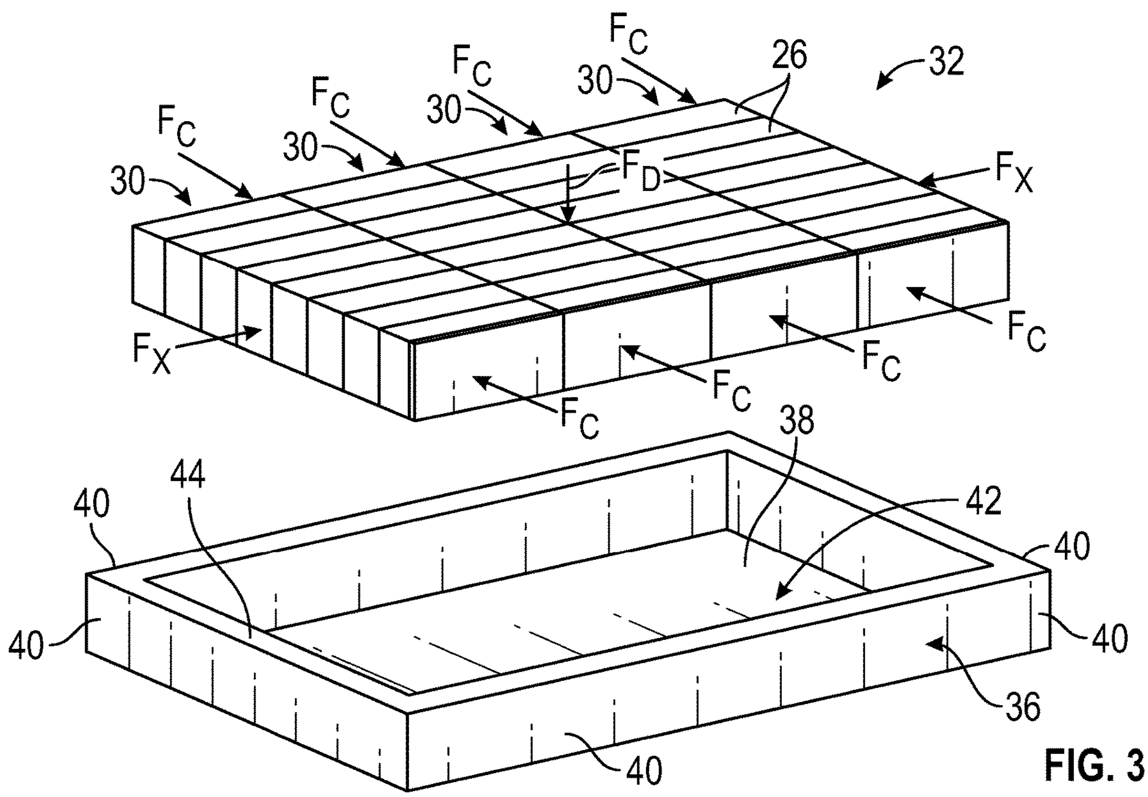
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force $F_C$ may be applied to opposed ends of one of the cell stacks 30. The compressive force $F_C$ essentially squeezes the battery cells 26 within the cell stack 30, thereby compressing the cell stack 30 and the individual battery cells 26 to a reduced thickness. While the compressive force $F_C$ is applied to the cell stack 30, the cell stack 30 may be inserted into a respective cell-compressing opening 42 by a downward force $F_D$. The downward force $F_D$ may be applied directly to one or more of the battery cells 26.

While the term "downward" is used herein to describe the downward force $F_D$, it should be understood that the term "downward" is used herein to refer to all forces tending to press a cell stack 30 into a cell compressing opening 42. In particular, the term "downward" refers to all forces substantially perpendicular to the compressive force $F_C$, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces Fx can compress the cell stacks 30 together for insertion of the cell matrix 32 into the cell-compressing opening 42. The compressive forces Fx are generally perpendicular to the compressive forces $F_C$. The compressive forces Fx may be applied together with the compressive forces $F_C$. The force $F_D$ may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above may be considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

FIGS. 4-9, with continued reference to FIGS. 1-3, schematically illustrate a method 50 for assembling portions of the traction battery pack 18, and in particular, for electrically connecting bus bars 82 to battery cell terminals 70 in order to electrically connect the battery cells 26 of each cell stack 30 of the cell-to-pack battery system 20. The battery cells 26 must be reliably connected to one another in order to achieve the desired voltage and power levels of the traction battery pack 18 necessary for driving the electrified vehicle 10.

Figure 4:
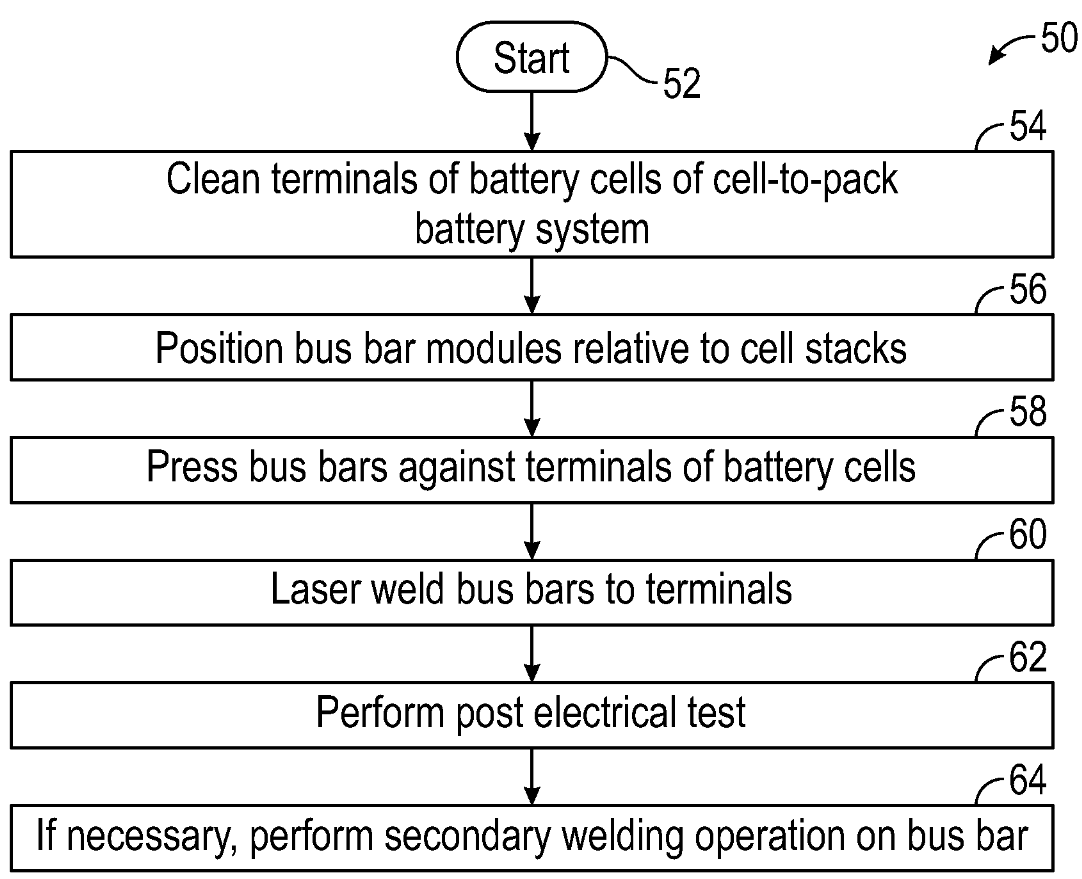
FIG. 4 schematically illustrates a method for welding bus bars to battery cell terminals as part of a manufacturing process for assembling a cell-to-pack battery system of a traction battery pack.
Figure 5:
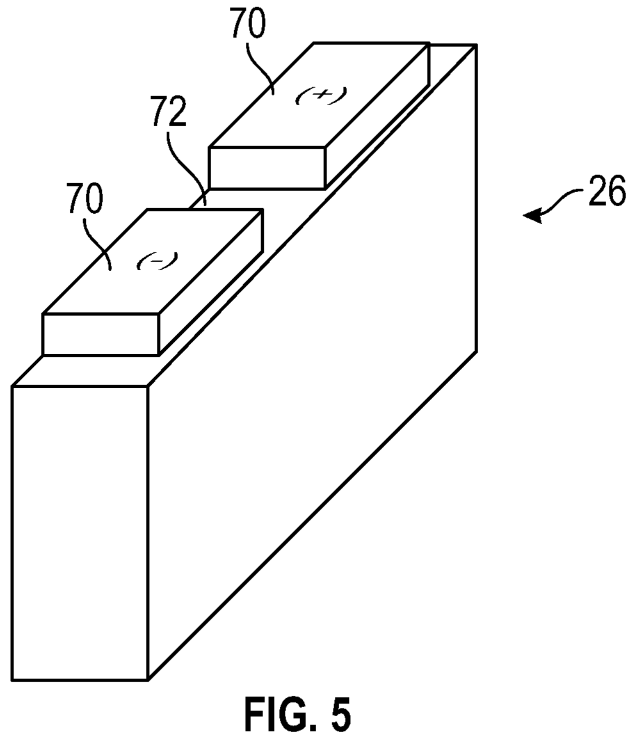
FIG. 5 illustrates a battery cell of a cell-to-pack battery system.

FIG. 4 is a flow chart of the method 50, whereas FIGS. 5-9 are included to better illustrate certain steps of the method 50. The method 50 may include a greater or fewer number of steps than recited below, and the exact order of the steps is not intended to limit this disclosure.

The method 50 may begin at block 52. At block 54, terminals 70 of each battery cell 26 of the cell matrix 32 of the cell-to-pack battery system 20 may be cleaned. The terminals 70 may be located at a top side 72 of each battery cell 26, and each battery cell 26 may include both a positive (+) terminal and a negative (−) terminal (see FIG. 5). The terminals 70 may be cleaned using a suitable cleaning agent, such as alcohol, for example.

Next, at block 56, one or more bus bar modules 74 of the cell-to-pack battery system 20 may be positioned relative to each of the cell stacks 30 of the cell matrix 32. In an embodiment, one bus bar module 74 is positioned over top of each cell stack 30 of the cell matrix 32 (see FIG. 6). The bus bar modules 74 may therefore be positioned over top of the terminals 70 of the battery cells 26. However, other configurations are further contemplated within the scope of this disclosure.

Figure 6:
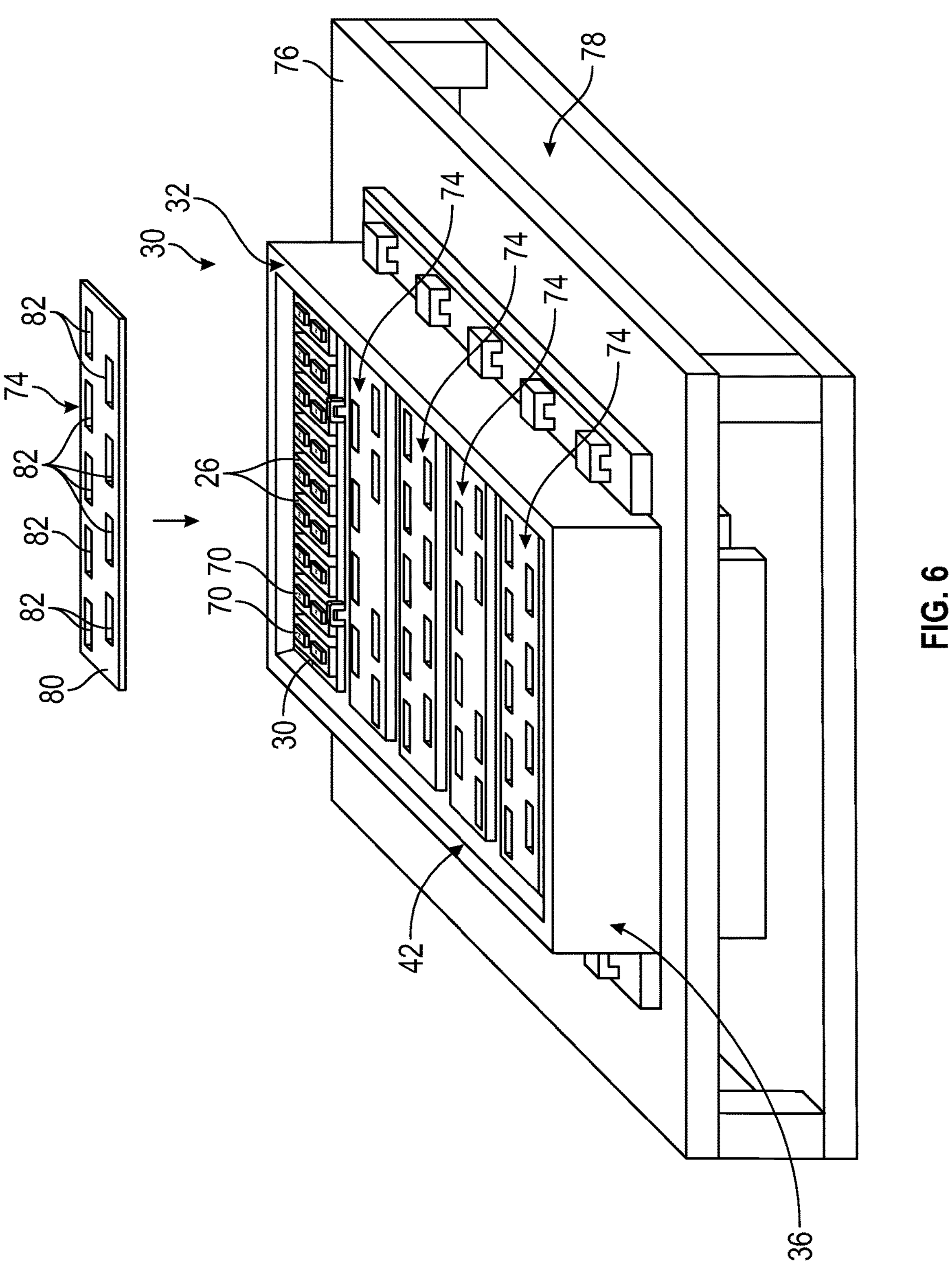
FIG. 6 illustrates a bus bar module positioning step of the method of FIG. 4.
Figure 7:
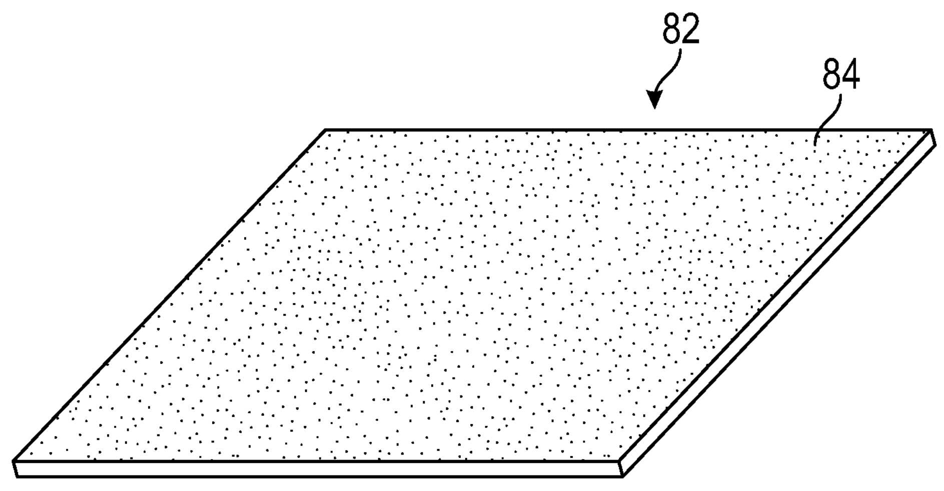
FIG. 7 illustrates a bus bar of a cell-to-pack battery system.
Figure 8:
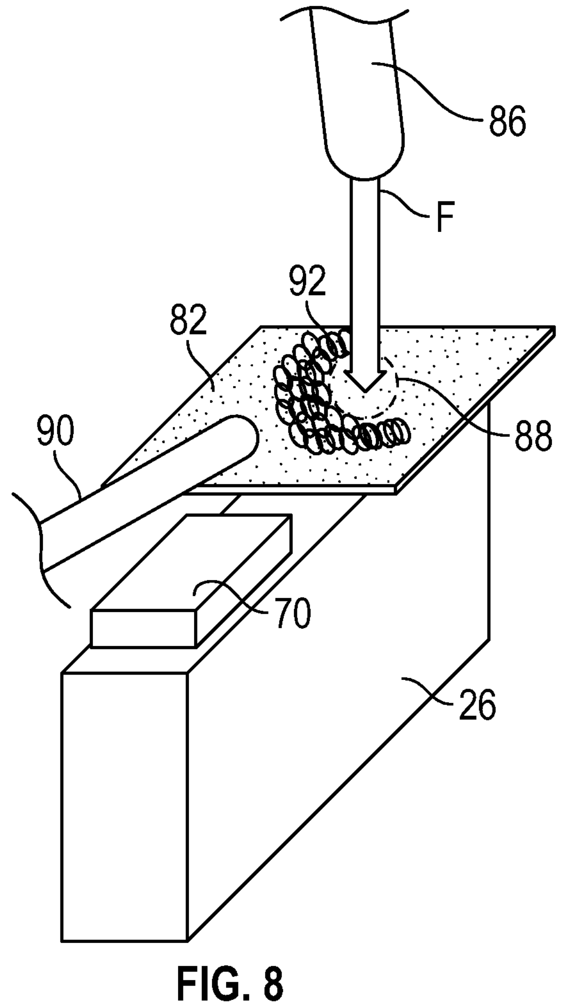
FIG. 8 illustrates a pressing step of the method of FIG. 4.
Figure 9:
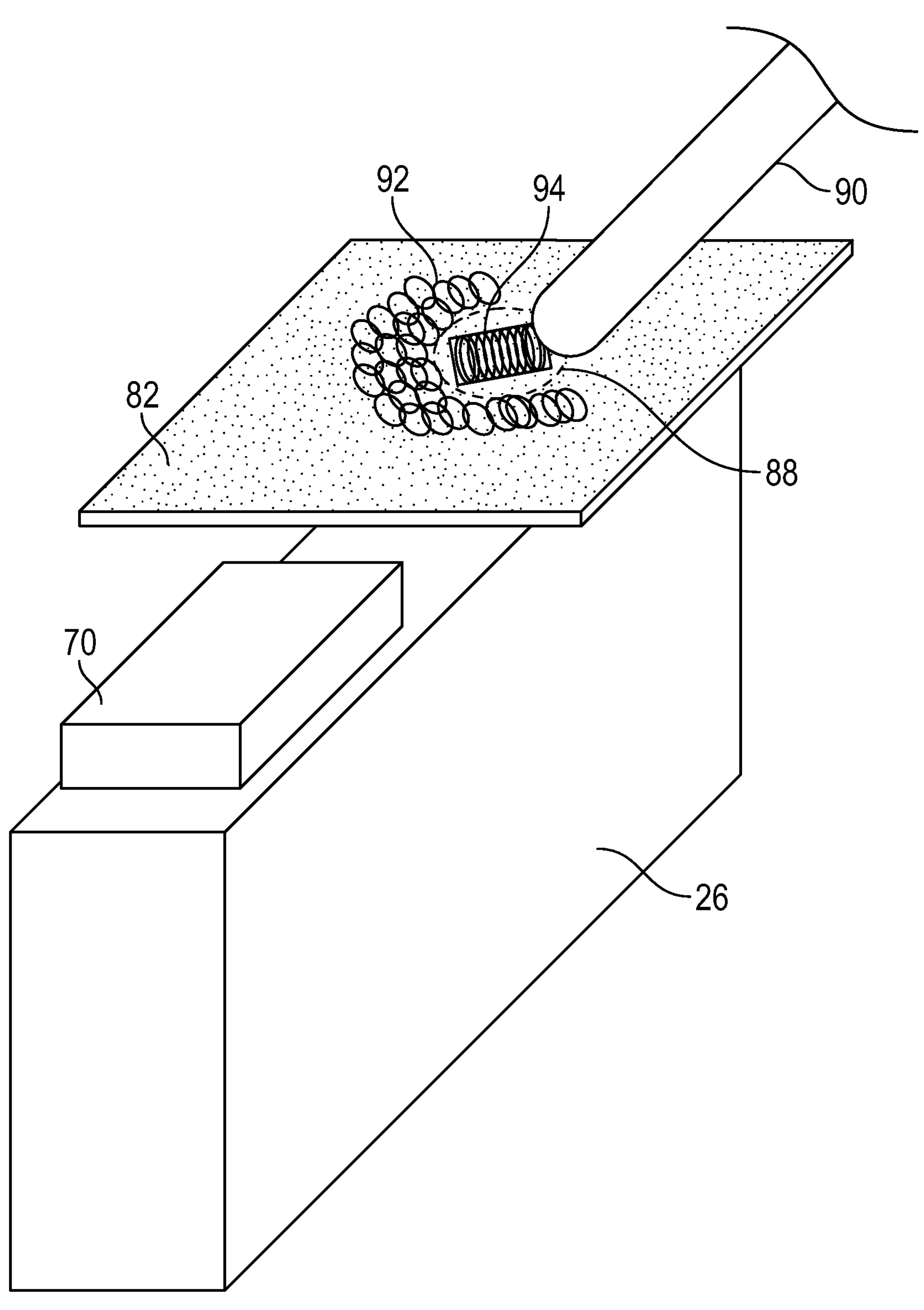
FIG. 9 illustrates a repair welding operation of the method of FIG. 4.

As shown in FIG. 6, the cell matrix 32 of the cell-to-pack battery system 20 may be received within the cell-compressing opening 42 of the enclosure tray 36 (or some other halo-like structure) during block 56. Further, the enclosure tray 36 may be positioned on a flat surface 76 of an assembly pallet 78 associated with a workstation of a manufacturing assembly line.

Each bus bar module 74 may include a carrier 80 and a plurality of bus bars 82 that are mounted to/held within the carrier 80. The total number of bus bars 82 provided within the carrier 80 may vary and could depend on the number of battery cells 26 provided within each cell stack 30, among various other factors.

The carrier 80 may be made of an insulating plastic material, such as a suitable thermoplastic or thermoset, for example. However, other insulating materials may also be utilized within the scope of this disclosure. The bus bars 82 may be made of a metallic material, such as copper, for example. In an embodiment, the bus bars 82 are made of copper and are coated with an outer coating 84 (see FIG. 7) made of either aluminum or nickel and designed to maximize thermal absorption during welding. The bus bars 82 may therefore be bimetallic structures. However, the exact size, shape, and material make-up of each bus bar 82 is not intended to limit this disclosure.

Referring again to FIG. 4, the method 50 may proceed to block 58 after positioning the bus bar modules 74 over the cell stacks 30. At this step, the bus bars 82 of the bus bar module 74 may be pressed against the terminals 70 of the battery cells 26 associated with one of the cell stacks 30 of the cell matrix 32. In an embodiment, each bus bar 82 of the bus bar module 74 is pressed against one or more terminals 70 of the respective cell stack 30. In another embodiment, each bus bar 82 may be pressed against one terminal of each of two neighboring battery cells 26 of the cell stack 30.

A pressing device 86 (see FIG. 8) may be utilized to press the bus bar 82 directly against the terminal(s) 70 during block 58. The pressing device 86 may be configured to apply a calibrated pressing force F to the bus bar 82. The area of the bus bar 82 contacted by the pressing device 86 is schematically illustrated at reference numeral "88" and may be referred to as a weld repair zone of the bus bar 82.

Next, at block 60, the bus bars 82 may be laser welded to the terminals 70. Although laser welding is specifically disclosed herein, it should be understood that other welding processes could be utilized to electrically connect the bus bars 82 to the terminals 70.

During an exemplary laser welding process, a laser welding device 90 may be positioned relative to the bus bar 82 and may be controlled to form a primary weld bead 92 (see FIG. 8) for joining the bus bar 82 to the terminal(s) 70. The primary weld bead 92 may include an arc or horseshoe shape and may include a repeating pattern of circular welds. However, other weld configurations are further contemplated within the scope of this disclosure. The pressing device 86 may maintain the press force F against the bus bar 82 during the formation of the primary weld bead 92. Therefore, the primary weld bead 92 may be formed at a location of the bus bar 82 that is immediately adjacent to the weld repair zone 88. In an embodiment, the primary weld bead 92 at least partially surrounds the weld repair zone 88.

A post electrical test may then be performed on the welded bus bars 82 at block 62. The post electrical test may be performed to identify defects in the primary weld bead 92, for example.

If necessary, secondary welding operations may be performed on the bus bars 82 at block 64. During the secondary welding operations, the laser welding device 90 may be located relative to the bus bar 82 and may be controlled for forming a repair weld bead 94 on the bus bar 82 (see FIG. 9). The repair weld bead 94 may be created in the weld repair zone 88 that was previously covered by the pressing device 86 and may be shaped differently than the primary weld bead 92. The hold down area of each bus bar 82 may therefore be repurposed as a weld repair location for completing the welding operations necessary for electrically connecting the bus bars 82 to the terminals 70 included within the cell matrix 32.

The steps of the method 50 described above may be performed for each bus bar 82 of each bus bar module 74. The pressing and welding steps can each be performed sequentially or simultaneously such that one or more bus bars 82 can be pressed/welded simultaneously with the pressing/welding of other bus bars 82 of the cell-to-pack battery system 20.

Moreover, the pressing and welding steps described above could be part of an automated process that is performed by robotic automation tooling. In other implementations, all or portions of the pressing and welding steps can be manually performed at one or more workstations of the assembly line, such as by an assembly line worker(s).

The exemplary manufacturing processes described herein provide a methodology for electrically connecting bus bars to battery cell terminals with increased geometric accuracy within a cell-to-pack battery system. The proposed solutions maintain required tolerances and allow welds to be repaired in the case of first pass rejections.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of assembling a traction battery pack, comprising:

performing a primary welding operation on a bus bar of a battery system of the traction battery pack, wherein, during the primary welding operation, a primary weld bead is formed on the bus bar;

performing a secondary welding operation on the bus bar, wherein, during the secondary welding operation, a repair weld bead is formed within a weld repair zone of the bus bar, wherein the primary weld bead and the repair weld bead do not overlap and are formed at different locations of the bus bar; and prior to performing the primary welding operation and the secondary welding operation, pressing the bus bar against a terminal of a battery cell of the battery system, wherein, during the primary welding operation, a pressing device for performing the pressing is positioned to cover the weld repair zone of the bus bar.

2. The method as recited in claim 1, wherein the primary weld bead is formed at a location that is adjacent to but not within the weld repair zone.

3. The method as recited in claim 1, wherein the primary weld bead includes an arced shape or a horseshoe shape.

4. The method as recited in claim 1, comprising, prior to performing the secondary welding operation, performing a post electrical test on the primary weld bead.

5. The method as recited in claim 1, comprising, prior to performing the primary welding operation and the secondary welding operation, cleaning the terminal of the battery cell that the bus bar is to be connected to.

6. The method as recited in claim 1, wherein, during the secondary welding operation, the weld repair zone is uncovered by the pressing device.

7. The method as recited in claim 1, wherein the primary welding operation and the secondary welding operation are laser welding operations.

8. A method for assembling a traction battery pack, comprising:

pressing a bus bar against a terminal of a battery cell;

forming a primary weld bead for joining the bus bar to the terminal;

testing the primary weld bead; and when the primary weld bead does not pass the testing, forming a repair weld bead adjacent to the primary weld bead, wherein the repair weld bead is formed at a weld repair zone of the bus bar that is covered by a pressing tool when forming the primary weld bead.

9. The method as recited in claim 8, wherein the battery cell is part of a cell matrix of a cell-to-pack battery system of the traction battery pack.

10. The method as recited in claim 9, wherein the cell matrix is received within a cell-compressing opening of an enclosure tray of the traction battery pack during the pressing and the forming.

11. The method as recited in claim 8, wherein forming the primary weld bead includes performing a first laser welding operation, and further wherein forming the repair weld bead includes performing a second laser welding operation.

12. The method as recited in claim 8, wherein the primary weld bead includes an arced shape or a horseshoe shape.

13. The method as recited in claim 8, wherein the repair weld bead is shaped differently than the primary weld bead.

14. The method as recited in claim 8, comprising, prior to the pressing and the forming, cleaning the terminal of the battery cell.

15. The method as recited in claim 8, wherein the bus bar is connected to a carrier of a bus bar module.

16. The method as recited in claim 15, comprising, prior to the pressing, positioning the bus bar module over a cell stack that includes the battery cell, wherein the cell stack is part of a cell-to-pack battery system of the traction battery pack.

17. A method for assembling a traction battery pack, comprising:

applying a pressing force to press a bus bar against a terminal of a battery cell;

while maintaining the pressing force, forming a primary weld bead for joining the bus bar to the terminal;

removing the pressing force after completing the primary weld bead to expose a weld repair zone of the bus bar;

forming a repair weld bead at the weld repair zone, wherein, after forming both the primary weld bead and the repair weld bead, the primary weld bead at least partially surrounds the repair weld bead;

prior to applying the pressing force, positioning the battery cell within a cell-compressing opening of an enclosure tray of the traction battery pack; and positioning the enclosure tray on a flat surface of an assembly pallet.

* * * * *